United States Patent [19]

Nanjo

[11] 4,343,549
[45] Aug. 10, 1982

[54] BOX TYPE CONTACT PRINTER

[75] Inventor: Yasuyuki Nanjo, Nishi, Japan

[73] Assignee: Dainippon Screen Seizo Kabushiki Kaisha, Kyoto, Japan

[21] Appl. No.: 193,351

[22] Filed: Oct. 2, 1980

[30] Foreign Application Priority Data

Oct. 9, 1979 [JP] Japan ............................ 54-139771[U]

[51] Int. Cl.³ .................................................. G03B 27/04
[52] U.S. Cl. .................................................... 355/113
[58] Field of Search ............... 355/113, 114, 115, 116, 355/117, 118, 120, 121

[56] References Cited

U.S. PATENT DOCUMENTS

| | | | |
|---|---|---|---|
| 1,261,177 | 4/1918 | Strong | 355/114 |
| 3,234,868 | 2/1966 | Appeldorn et al. | 355/115 |
| 3,630,614 | 12/1971 | Kazie | 355/113 |
| 3,715,160 | 2/1973 | Fader | 355/113 |
| 3,765,762 | 10/1973 | Lidonnici | 355/113 |
| 4,184,428 | 1/1980 | Hosoya | 355/118 |

Primary Examiner—L. T. Hix
Assistant Examiner—Alan Mathews
Attorney, Agent, or Firm—Marvin E. Jacobs

[57] ABSTRACT

A box type contact printer for photographic plate making is disclosed. A lower frame and an upper frame positioned thereon, the latter being made of a transparent material, are pivotally connected to each other at their rear ends so that a photosensitive material and an original picture put thereon may be positioned between the two frames, and a shield box having a front opening for covering the frames includes an exposure light source in its inside top. The front opening is adapted to be covered by a roll-up curtain. At least one lower front corner portion of the side walls of the shield box is diagonally cut off, and the upper frame is provided with a shield plate which is disposed so as to shield the cut-off portion of the cut off side wall when the lower and the upper frames are closed.

3 Claims, 3 Drawing Figures

BOX TYPE CONTACT PRINTER

BACKGROUND OF THE INVENTION

This invention relates to a box type contact printer for photographic plate making, and the like.

A conventional vacuum contact printing frame means comprising a lower frame which is provided with an airtight soft sheet, and an upper frame, positioned thereon, which is provided with a transparent plate, wherein the lower and the upper frames are pivotally connected to each other in their rear ends. A photosensitive material such as a photosensitive film or plate and an original picture film or plate which is put thereon, are inserted between the upper and the lower frames and are closely contacted to each other under the vacuum pressure by means of a vacuum means. Then, the printing is carried out by applying the light onto the photosensitive film through the transparent plate.

The printing frame means is covered by a shield box including an exposure light source on its top therein and having a front opening so as to prevent a large quantity of light from leaking out during the printing operation. The front opening of the shield box is also shielded by a curtain during the printing operation.

However, in this kind of the contact printer, when the printing frame means is relatively small, the front opening of the shield box is also small, which is inconvenience and not operative on the occasion of mounting and demounting the original plate and the photosensitive plate.

SUMMARY OF THE INVENTION

It is an object of the present invention to provide a box type contact printer free from the aforementioned inconveniences, which is simple and operative.

According to the present invention there is provided a box type contact printer comprising (a) a lower frame and an upper frame positioned thereon, the latter being made of a transparent material, which are pivotally connected to each other at their rear ends so that a photosensitive material and an original picture put thereon may be positioned between the frames, and (b) a shield box for covering the frames, including an exposure light source in its inside top and having a front opening which is adapted to be shielded by a roll-up sheet member, wherein the lower front corner portion of one of the side walls of the shield box is diagonally cut off, and wherein the upper frame is provided with a shield plate which is disposed so as to shield the cut-off portion of the cut-off side wall when the lower and the upper frames are closed.

BRIEF DESCRIPTION OF DRAWINGS

In order that the present invention may be better understood, a preferred embodiment will now be described with reference to the accompanying drawings, in which.

DESCRIPTION OF A PREFERRED EMBODIMENT

Figure 1:
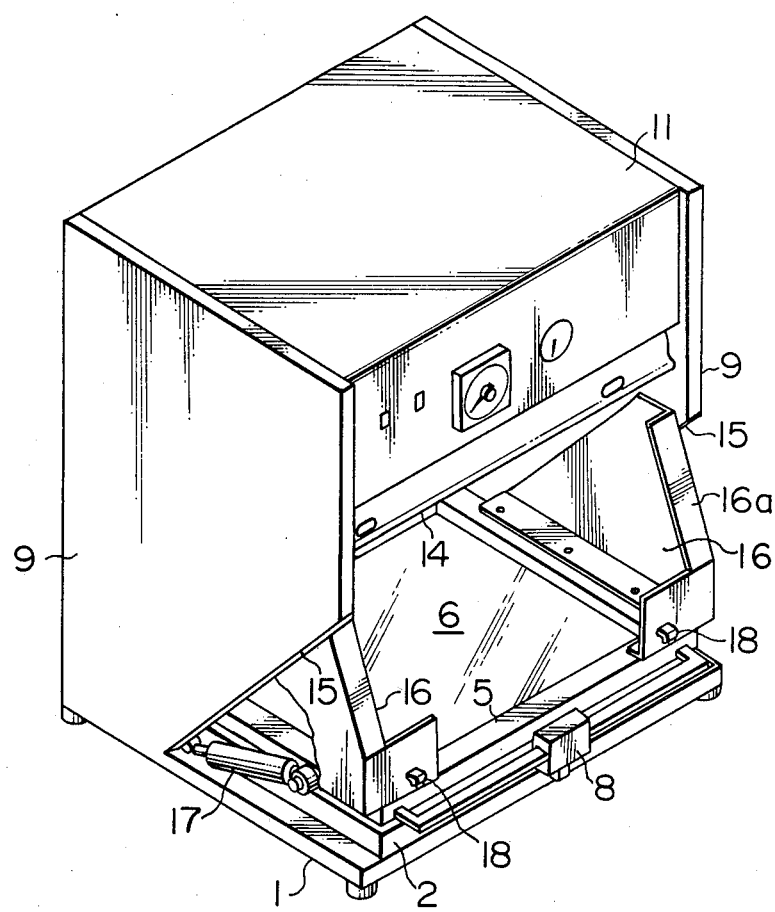
FIG. 1 is a perspective view of a box type contact printer according to the present invention.

Referring now to the drawings there is shown a box type contact printer according to the present invention.

A lower frame 2 is mounted to a base 1 and a soft rubber sheet 3 with a packing member 4 arranged in its surroundings is disposed onto the lower frame 2.

Figure 2:
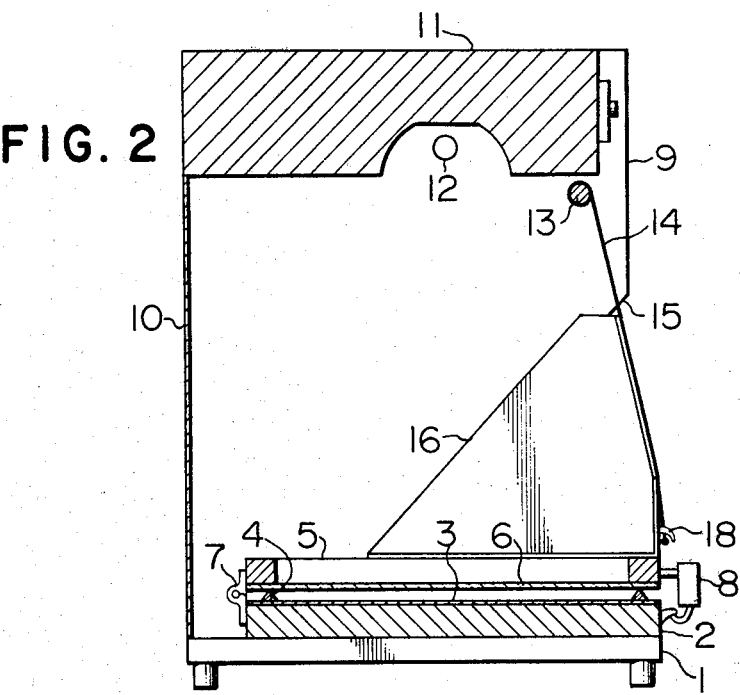
FIG. 2 is a longitudinal cross-section of the printer in FIG. 1, wherein an upper frame is closed.
Figure 3:
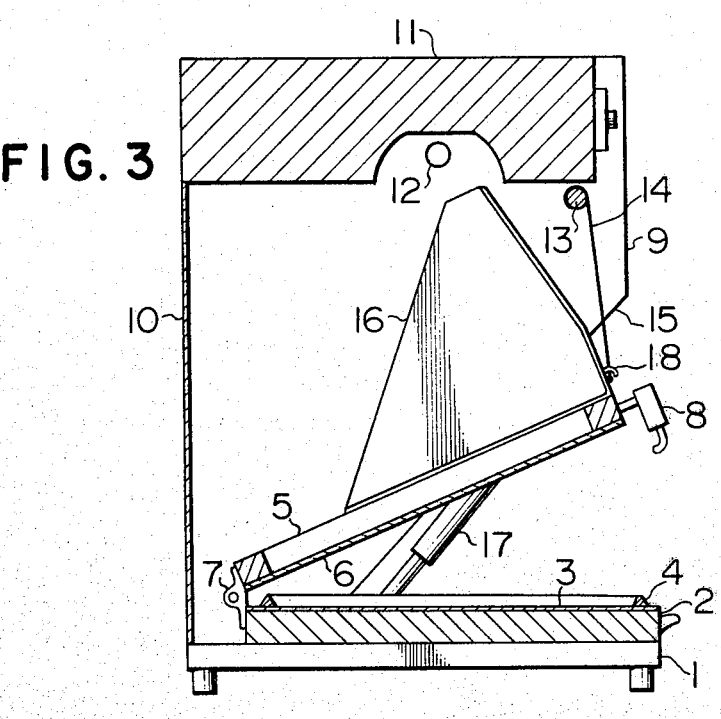
FIG. 3 is a longitudinal cross-section of the printer in FIG. 1, wherein the upper frame is opened.

An upper frame 5 including a transparent glass plate 6 on its lower surface is pivotally mounted to the lower frame 2 at their rear ends by a hinge 7 so as to be opened or closed, as shown in FIG. 3. The upper frame 5 may be fixed by a hook 8, when it is closed, i.e. the transparent glass plate 6 is closely contacted with the packing member 4, as shown in FIG. 2. The rubber sheet 3 is perforated with a lot of small openings (not shown) which lead to a conduit (not shown) which is formed in the lower frame 2 and is connected to a vacuum pump (not shown).

When a photosensitive material such a film or plate and an original picture film or plate put thereon are put between the upper and the lower frames 5 and 2 and the upper frame 5 is closed, the space between the upper and the lower frames 5 and 2 is evacuated by actuating the vacuum pump so that the photosensitive film or plate and the original picture film or plate may tightly be contacted to each other.

The upper frame 5 opened or raised is supported by a pair of support arms, each comprising a coil spring and a cylinder holding the coil spring, which are arranged at the sides of the frames 2 and 5.

A pair of side plates 9 and a rear plate 10 are erected in both the sides and the rear end of the base 1. A box 11 for containing mechanical parts is arranged in the tops of the side plates and the rear plate. Accordingly, the base 1, the side plates 9, the rear plate 10, and the top box 11 constitute a shield box-shape having a front opening.

An exposure light source 12 is arranged in a hollow formed in the bottom of the top of box 11. In the front bottom portion of the top box 11 a spring roller 13 which rolls up a light-shield curtain 14 is mounted. The free end of the curtain 14 is adapted to be fixed to the front end of the upper frame 5 by hooks 18 so that the curtain 14 may cover the front opening and prevent the light from leaking out of the inside of the shield box.

The lower front corner portions of the side plates 9 are cut off diagonally along inclined sides 15, so that, when the upper frame 5 is opened upwards, the photosensitive film or plate and the original picture film or plate may readily be arranged one on another and be mounted onto or demounted from the lower frame 2.

A pair of shield plates 16, each having substantially the same shape as the cut-off portion of the side plate 9 and being larger a little than it, are vertically disposed to both the sides of the upper frame 5 so that, when the upper frame 5 is closed, the shield plates 16 may cover the cut-off portions of the side plates 9. In this embodiment, as shown in the drawings, the shield plates 16 extend somewhat outside from the side of the upper frame 5 adjacently to the side plates 9 in order to shield the light completely. Each shield plate 16 includes a front guide portion 16a extending inside perpendicular to the shield plate 16, which reinforces the shield plate 16 and guides the shield curtain 14. The hook 18 is attached to the lower part of each front guide portion 16a.

According to the present invention, of course, only one of the side plates 9 need be cut off in the same manner as described above, and one shield plate 16 is mounted on the upper frame accordingly.

Although the present invention has been shown and described in terms of a preferred embodiment illustrated by the accompanying drawings, however, various changes and modifications can be made by those skilled in the art without departing from the scope of the present invention.

What is claimed is:

1. A box type contact printer comprising:
   (a) a lower frame and an upper, transparent frame positioned thereon, said frames being pivotally connected to each other at their rear ends so as to rotate from an open to a closed position so that a photosensitive material and an original picture disposed thereon may be positioned between the frames when in open position; and
   (b) a shield box for covering the frames including a top wall, a rear wall and two side walls defining a front opening which is adapted to be shielded by a roll-up, opaque sheet member, an exposure light source mounted in said box above the upper frame, wherein a side opening is defined in the lower front corner portion of at least one of the side walls of the shield box by means of a diagonally cut off section, and wherein an opaque, shield plate is mounted on the upper frame disposed and shaped so as to shield said openings in the side walls from leakage of exposure light when the lower and upper frames are in said closed position.

2. A box type printer as defined in claim 1, wherein said side openings are formed in the lower front portions of both of the side walls of the shield box, and wherein the upper frame is provided with two, opaque shield plates which are disposed and shaped so as to shield the side openings when the lower and the upper frames are in closed position.

3. A box type contact printer as defined in claims 1 or 2, wherein each shield plate is somewhat larger than each of said openings in order to shield the light completely.

* * * * *